March 8, 1966 D. R. LUDWIG ET AL 3,239,744

FREQUENCY MULTIPLIER

Original Filed Sept. 8, 1960

INVENTORS
DAVID R. LUDWIG
ROBERT P. RAFUSE
BY Walter J. Kreske
ATTORNEY

United States Patent Office 3,239,744

Patented Mar. 8, 1966

3,239,744
FREQUENCY MULTIPLIER

David R. Ludwig, Braintree, and Robert P. Rafuse, Newton Center, Mass., assignors to General Electronic Laboratories, Inc., Cambridge, Mass., a corporation of Massachusetts Continuation of application Ser. No. 54,804, Sept. 8, 1960. This application Apr. 16, 1965, Ser. No. 452,442
15 Claims. (Cl. 321—69)

This is a continuation application of application Serial No. 54,804, filed Sept. 8, 1960, and now abandoned.

This invention relates to frequency multipliers, and more particularly to broad band microwave frequency multipliers. By broad band as used herein is meant a frequency range equal to approximately one half that of the lower operating frequency.

In the past it has been customary to use non-linear resistive devices such as resistive silicon detector or mixer diodes as the harmonic signal generating element in microwave frequency multipliers. A problem in this type of structure is its relatively poor efficiency at low input or driving levels. Also, previous frequency signal multiplying devices have required manual tuning to achieve specific output frequencies and the operating frequency range for any one tuned setting was very small, an undesirable limitation which placed them in the classification of tunable narrow band devices. Also, multipliers heretofore used had no inherent structure eliminating undesired harmonics and required external filtering for such purpose. Because of the delicate physical nature of the resistive detector diodes used in previous multiplier devices, they were relatively sensitive to physical shock and vibration and susceptible to radio frequency burnout at moderate input power levels.

Pursuant to the present invention, these problems have been overcome in an improved microwave frequency multiplier which additionally has other desirable features and advantages. Among these other desirable features and advantages is a frequency multiplier which is readily adjustable for attachment to other elements in a microwave system. Another of these desirable features is the ability to vary the angle of input and output waveguides throughout an entire 360 degrees. A further desirable feature is that the electrical characteristics of the device are not affected by such angular variation between input and output waveguides. The frequency multiplier is also readily adaptable for coaxial to coaxial input and output connectors. It is relatively unaffected by humidity, heat to over 100 degrees centigrade, and atmospheric pressure changes. It requires no external biasing source and is self biasing. The bandpass characteristics do not change appreciably with the drive level. No manual tuning or adjustment of any kind is needed throughout the entire broad band of operating frequencies. Thus, the device may be readily imbedded in a wide variety of potting materials to provide such advantages as fungus proofing, impact and vibration absorption.

Accordingly, a primary object of the present invention is the provision of a microwave frequency multiplier device with unusually wide bandwidth characteristics.

Another object is the provision of a microwave frequency multiplier device with a relatively high efficiency of operation.

And a further object is the provision of a microwave frequency multiplier device whose electrical characteristics are substantially independent of environmental conditions.

And a still further object is the provision of a microwave frequency multiplier device with will continue to operate even under high impact, vibration and shock conditions.

A further object is the provision of a microwave frequency multiplier device having versatile geometrical adaptability of input and output waveguide elements.

And another object is the provision of a microwave frequency multiplier device which needs no tuning adjustment over its entire broad operational frequency band.

These objects, features and advantages are achieved generally by providing a pair of resonant waveguide circuits and a nonlinear capacitive coupling structure, the coupling structure being arranged to couple one of the pair of resonant waveguide circuits to the other of the pair of resonant waveguide circuits with capacity for frequency conversion therebetween.

By making the waveguide circuits broadly resonant and the capacitive coupling with a broadband characteristic, a broadband characteristic of the overall multiplier device is thereby achieved.

By inserting a low Q tuned iris in each of the pair of waveguides, a relatively simple and inexpensive filter arrangement suitable for use in the present invention is thereby achieved as well as a suitable structure in the input waveguide for reflecting proper impedance to the varactor at the output frequency.

By inserting a plurality of low Q tuned irises in the output waveguide and spaced by a quarter wavelength of the mean frequency, increased suppression of undesired harmonic frequencies is thereby achieved.

By inserting a varactor structure having a broadband impedance matching arrangement in the pair of waveguides, a particularly efficient coupling with capacity for frequency conversion is thereby achieved.

By using a varactor structure comprised of electrically conductive probes on either end of the varactor, with each of the probes projecting into a respective waveguide, a simple and effective structure for coupling between the waveguides is thereby achieved.

By using a miniature microwave varactor which is small with respect to the highest operating wavelength, coupling circuitry substantially independent of the physical dimensions of the varactor is thereby achieved.

By adjusting the impedance reflected in the plane of the varactor by a backshort in each of the waveguides and by adjusting the impedance transformation controlled by the probe length in the respective waveguide a broadband coupling arrangement to and from the varactor in the wave guides is thereby achieved.

By placement of an electrically lossy impedance element in the input waveguide adjacent the varactor in manner having substantially no affect on impedance transformation of the probe, the frequency sensitivity of the coupling scheme may be further reduced to provide improved broadband operating characteristics.

By making the impedance element in the form of a concentric ferrite ring at the base of a Teflon support in the waveguide with the varactor and probes imbedded therein, a suitable and stable mechanical arrangement is thereby achieved.

These objects, features, and advantages will be better understood from the following description taken in connection with the accompanying drawings of preferred embodiments of the invention and wherein.

Figures 1, 2, 3, 4, 5, 6, 7, 8, 9:
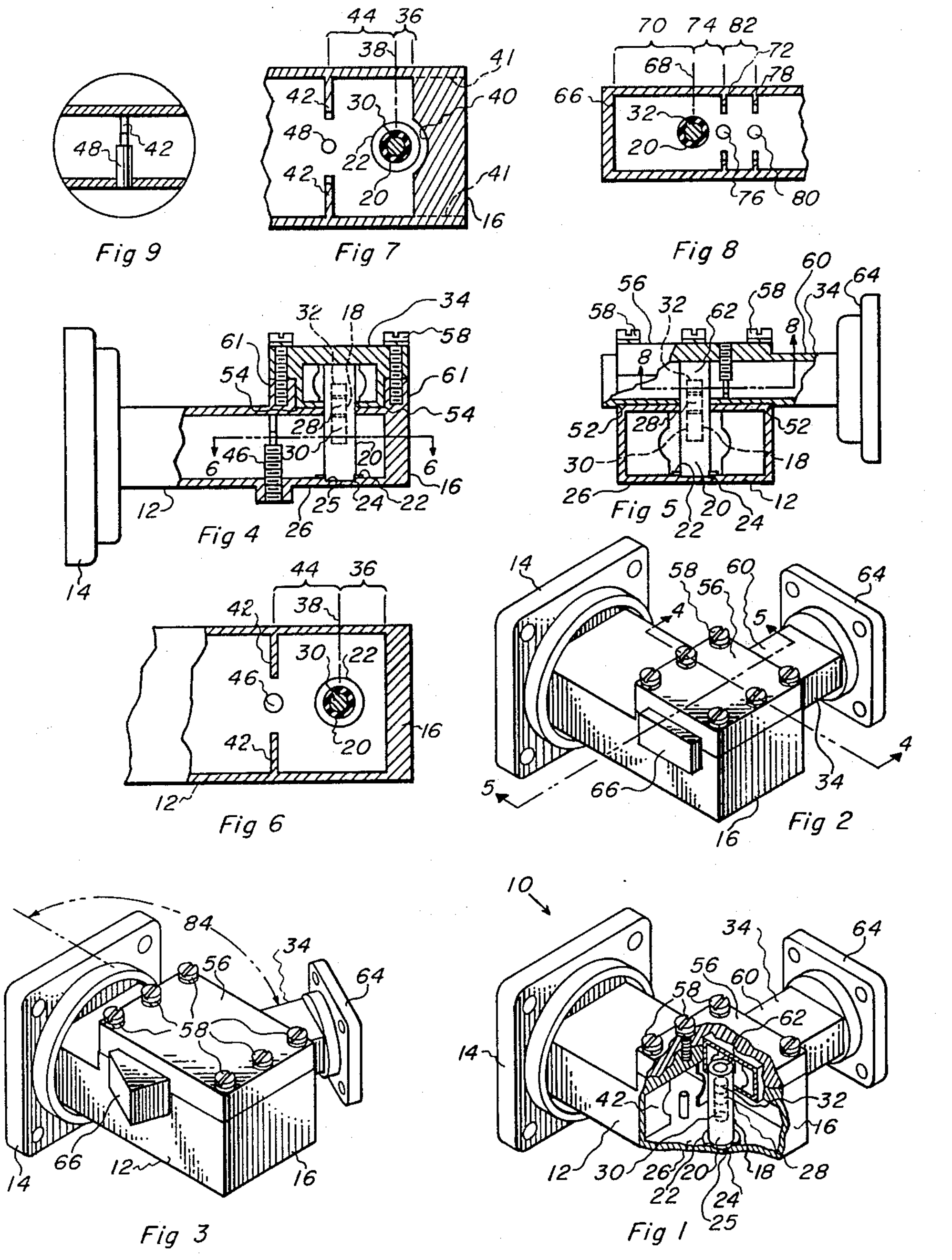
FIG. 1 is an isometric view of a microwave frequency multiplier made in accordance with the present invention and having cutaway section to more clearly show construction.
FIG. 2 is an isometric view of the microwave frequency multiplier shown in FIG. 1 showing the outside construction.
FIG. 3 is an isometric view of a microwave frequency multiplier made in accordance with the present invention and similar to that shown in FIGS. 1 and 2 except for the change in angular arrangement of the waveguide.
FIG. 4 is a side view of the embodiment shown in FIG. 2 with cutaway section taken on line 4—4 in FIG. 2.
FIG. 5 is a side view of the embodiment shown in FIG. 2 wtih cutaway section taken on line 5—5 of FIG. 2.
FIG. 6 is a top view of a portion of the embodiment shown in FIG. 2 with cutaway section on line 6—6 of FIG. 4.
FIG. 7 is a view illustrating an alternative construction to that shown in FIG. 6.
FIG. 8 is a cutaway section of the output waveguide taken on line 8—8 of FIG. 5.
FIG. 9 is a view of a portion of the structure in FIG. 4 to show alternative construction thereof.

Referring to FIG. 1 in more detail, a frequency multiplier made in accordance with the present invention is designated generally by the numeral 10. The frequency multiplier 10 has an input waveguide 12 of conventional design for the particular frequency band of operation such as for example 7 to 10 kilomegacycles. While the frequencies 7 to 10 kilomegacycles are here mentioned for purposes of illustration, it should be understood that the present invention may be used at least throughout the range of one kilomegacycle to more than twenty kilomegacycles by applying the principles which will be herein further described.

The input waveguide 12 has a coupling flange 14 of conventional design at one end for purposes of coupling to a source of microwave power (not shown). The input waveguide 12 has a closure wall or backshort 16 of electrically conductive material at its other end in spaced relation to a varactor structure 18 held in place by imbedding in a cylinder 20 of dielectric material such as Teflon or Rexolite or other suitable dielectric material. The Teflon cylinder 20 also has at its base a concentric ring 22 of material lossy or absorbtive to microwaves such as ferrite. A suitable ferrite material for the ring 22 is identified by the trade name Radite which is supplied by the Radar Design Corporation, Syracuse 11 New York.

The Teflon cylinder 20 is preferably held in place by a reduced diameter peripheral end 24 on which is fitted the ferrite ring 22 and held in place in an associated recess 25 in the wall 26 of the input waveguide 12. This Teflon holder structure 20 has as its primary function the provision of physical and mechanical stability in the present construction.

The varactor structure 18 includes a ceramic tube type microwave varactor 28 with a probe 30 of electrically conductive material as brass extending downwardly into the input waveguide 12 and a probe 32 of similar material extending upwardly into an output waveguide 34. The term varactor as used herein includes a PN junction diode of the type characterized by substantially no current leakage in the reverse bias direction. The varactor structure 18 is placed with respect to the backshort 16 a distance 36 from the centerline 38 of the varactor structure 18 such that it reflects the proper impedance to the plane of the varactor structure which runs through the centerline 38 perpendicular to the plane of the paper.

The impedance reflected to the plane represented by centerline 38 from the internal surface of the backshort 16, in conjunction with the impedance transformation represented by the probe 30 extending into the input waveguide 12, acts to provide a broadband coupling from the input waveguide 12 to the varactor 28. This desired coupling position may be obtained by a simple empirical procedure which will be hereinafter further described.

For purposes of adjustment of the distance 36, the backshort 16, in experimental or pilot models, may be in the form of a sliding plug as 16 in FIG. 7 with provision for sliding at broken lines 41. In some frequencies of operation, the distance 36 may become of such small dimension that it becomes desirable to provide a recess 40 in the backshort 16 to accommodate the varactor structure 18 as illustrated in the alternative construction shown in FIG. 7.

An iris band pass filter structure 42, placed transversely in the input waveguide 12, has a spacing 44 to the centerline 38 (FIGS. 6 and 7) equal to one quarter of the wavelength of the median input signals. The iris bandpass filter structure 42 is of conventional low Q design and is inserted for purposes of rejecting the second harmonic and is arranged with a capacitive post 46 adjusted for the particular frequency of operation to reflect proper impedance to the varactor structure 18 at the output frequency. As shown in FIG. 4, the capacitive post 46 is in the form of a screw and may alternatively be in the form of a cylindrical plug 48 shown in FIG. 9.

The output waveguide 34 is provided with a recessed portion 52 (FIG. 5) and the input waveguide 12 has a similar recess 54 (FIG. 4) such that the recesses 52 and 54 are closely dimensioned to receive and rigidly locate the output waveguide 34 with respect to the input waveguide 12 and provide good electrical conductivity therebetween to insure proper radiation shielding of the frequency multiplier 10 from interfering with or electrically affecting adjacent instruments or electrical components such as receiving equipment.

The waveguides 12 and 34 are then held in place to provide an overall rigid mechanical construction by a clamping arrangement which in the present instance consists of a holder plate 56 held in place by screws 58. For convenience of assembly, the plate 56 may be soldered to the top wall 60 of the output wave guide 34. Screws 58 which extend into threaded holes in blocks 61 (FIG. 4) soldered to the outer face of the input waveguide 12.

In place of providing the mechanical recesses 52 and 54, the input waveguide 12 and output waveguide 34 may alternatively be soldered together to insure similar protective arrangement from radiation leakage.

The length of the Teflon cylinder 20 is such that when the output waveguide 34 is assembled to the input waveguide 12, the Teflon cylinder 20 is lightly compressed between the two opposed walls of the waveguides, thereby providing a rigidly located varactor structure 18 essentially impervious to vibration and shock.

The varactor structure 18 may be imbedded in the Teflon cylinder 20 by drilling a hole concentrically thereof of size just to receive the varactor 28 and probes 30 and 32, then inserting thereover a teflon plug 62 (FIG. 1).

The output waveguide 34 has an output flange 64 of conventional design for coupling to associated output equipment (not shown) serving as a load for this device. The other end of the output waveguide 34 has a closure or backshort 66 which is placed with respect to the plane represented by the centerline 68 (FIG. 8) which is perpendicular to the plane of the paper by a distance 70 empirically determined in the manner similar to that described with respect to the distance 36 (FIG. 6).

The empirical determination of the distances 70 and 36 are made with experimental, pilot models which remain the same with production runs and are initially determined as follows: The input waveguide 12 is coupled to a driving frequency source such as a carcinotron (not shown) which is swept over the operating input frequency range of the frequency multiplier 10, the output from the frequency multiplier at the flange 64 is detected and presented on an oscilloscope in manner to plot output power versus output frequency. With that arrangement and with the back shorts 16 and 66 adjustable in the form of sliding plugs, the backshorts 16 and 66 are adjusted with respect to the varactor structure 18 for maximum broadband coupling. This operation is relatively simple and rapid one for finding the proper distances 36 and 70. It may be that for some frequency of output, the backshort 16 may have so small a distance 36 as to require a recess similar to that described with respect to FIG. 7.

An iris bandpass filter structure 72 placed a distance 74 (FIG. 8) is one quarter wavelength of the output frequency signal from the centerline 68 is tuned by a capactive post 76 to provide rejection of undesired higher harmonics. Additional irises such as 78 with similar capacitive posts such as 80 may be placed a similar quarter wavelength 82 from the iris 72 and may be used to provide additional rejection of undesired frequencies, if desired. The number of such additional irises selected is determined by the degree of rejection of unwanted harmonics desired at the output. The irises 72 and 78 with tuning plugs 76 and 80 may be of a construction similar to that described in connection with the iris 41 and tunable capacitive posts 46 and 48.

It should be noted that, as shown in FIG. 3, the output waveguide 34 in its angle of placement 84 with respect to the input waveguide 12 may be chosen arbitrarily to suit the particular application throughout an entire 360°. The electrical characteristics of this device remain the same for ank angle 84 throughout the 360° selection range.

This invention is not limited to the particular details of construction and operation as equivalents will suggest to those skilled in the art.

What is claimed is:

1. In combination, a pair of broadly resonant waveguide circuits having a minimum operating frequency range equal to approximately one half that of the lower operating frequency and with each having an electrically conductive wall, said electrically conductive walls in electrical engagement with each other and having a common opening therethrough, a non-linear capacitive coupling structure having a predominantly reactive electrical characteristic in the common opening and extending into the respective waveguides, the structure being arranged to couple one of the pair of resonant waveguide circuits to the other of the pair of resonant waveguide circuits with capability for frequency conversion therebetween.

2. The combination as in claim 1 wherein each of the waveguide circuits is broadly resonant and the non-linear capacitive coupling has a broadband characteristic.

3. The combination as in claim 1 wherein the non-linear capacitive coupling is a varactor coupling structure projecting into both of the resonant waveguide circuits.

4. In combination, a pair of broadly resonant waveguide circuits with one of said waveguide circuits providing the only input to said circuits and each having an electrically conductive wall, said electrically conductive walls in electrical engagement with each other and having a common opening therethrough, a non-linear capacitive coupling structure having a predominantly reactive electrical characteristic in the common opening and extending into the respective waveguides, the structure being arranged to couple one of the pair of resonant waveguide circuits to the other of the pair of resonant waveguide circuits with capability for frequency conversion therebetween.

5. In combination, a pair of broadly resonant waveguide circuits, one being an input waveguide circuit and the other being an output waveguide circuit, each of said circuits having an electrically conductive wall, said electric conductive walls in electrical engagement with each other and having a common opening therethrough, a non-linear capacitive coupling structure having a predominantly reactive electrical characteristic in the common opening and extending into the respective waveguides, the structure being arranged to couple one of the pair of resonant waveguide circuits to the other of the pair of resonant waveguide circuits with capability for frequency conversion therebetween, a low Q tuned iris in said input waveguide circuit positioned for reflecting proper impedance to said coupling structure, and a plurality of low Q tuned irises in the output waveguide circuit arranged for suppression of undesired frequencies.

6. In a microwave frequency converter, the combination of an input and an output waveguide fixed in electrical engagement with each other, a varactor coupling structure projecting into each of the waveguides, and a backshort in each of the waveguides in spaced relation to the varactor structure with the backshort in the input waveguide being positioned close to the varactor structure at approximately one quarter wavelength therefrom for reflecting the proper impedance to the varactor structure.

7. In a microwave frequency converter, the combination of an input and an output waveguide fixed in electrical engagement with each other, a varactor coupling structure projecting into each of the waveguides, a backshort in each of the waveguides in spaced relation to the varactor structure with the backshort in the input waveguide being positioned close to the varactor structure at approximately one quarter wavelength therefrom for reflecting proper impedance to the varactor structure, and an electrically lossy impedance matching element fixed in spaced relation to the varactor structure.

8. In a microwave frequency converter, the combination of an input waveguide of rectangular cross section proportioned for carrying a band of selected input frequencies and having the two broader walls in opposed relation to each other, an output waveguide of rectangular cross section proportioned for carrying a band of selected output frequencies differing in harmonic relation from the input frequencies and having the two broader walls in opposed relation to each other, the waveguides being fixed together with a wall of each in electrical engagement and with a common opening in said electrically engaging walls, a Teflon member in said opening and terminating at the respective opposed walls of the waveguides, a microwave varactor having two ends of electrically conductive material forming terminals in opposed relation to each other on a common axis, two probes of electrically conductive material, each in electrical engagement with a respective one of the terminals and extending along said axis, the varactor and probes embedded in the Teflon member in position such that said axis is perpendicular to said walls of the waveguides and one of the probes extends into the input waveguide and the other of the probes extends into the output waveguide, a backshort in each of the waveguides spaced from the respective probe to provide broadband coupling to and from the varactor, a ferrite ring held in place about said axis at the opposed wall of the input waveguide by said Teflon member, an iris type band pass filter structure in the input waveguide and spaced about one quarter wavelength of the median input frequency from the varactor, and a plurality of iris type band pass filters in the output waveguide spaced at approximately one quarter wavelength intervals of the median output frequency from the varactor in the output direction.

9. In a microwave frequency converter, the combination of an input and an output waveguide fixed in electrical engagement with each other, a microwave varactor with a probe fixed in electrical engagement at each end of the varactor, means fixing the varactor in the waveguides with one of the probes extending into the input waveguide and the other probe extending into the output waveguide, a ferrite impedance matching element fixed in the input waveguide in said probe extending direction and in spaced relation to said input waveguide probe, and an electrically conductive closure wall in each of the waveguides spaced from the respective probe with the closure wall in the input waveguide being close to the varactor to reflect proper impedance to the varactor for broadband coupling to and from the varactor in the waveguide.

10. In a microwave frequency converter, the combination of an input and an output waveguide fixed one upon the other in electrical engagement and having a common opening therebetween, a PN junction diode of the type characterized by low current leakage both in the forward and the reverse bias directions, the diode being in the opening and having two terminals, an elongated electrically conductive member in electrical engagement with one of the terminals and extending into and terminating in the input waveguide, another elongated electrically conductive member in electrical engagement with the other terminal extending into the output waveguide, a closure member of electrically conductive material across the input waveguide located close to the conductive member extending into the input waveguide for reflecting proper impedance to the plane of the varactor, a closure member of electrically conductive material across the output waveguide located adjacent the conductive member extending into the output waveguide, the size of the conductive members and spacing from the respective closures being proportioned for broadband coupling from the input waveguide to the diode and from the diode to the output waveguide.

11. The combination as in claim 10 wherein the PN junction diode is of silicon.

12. The combination as in claim 10 having additionally filter means in the input and output waveguides for suppressing frequencies outside the operating bands in the respective waveguides.

13. The combination as in claim 10 having additionally an impedance element in the input waveguide spaced from the PN junction diode for improving broadband characteristics.

14. In combination, a pair of broadly resonant waveguide circuits, a low Q tuned iris in each of said waveguide circuits having an electrically conductive wall, said electrically conductive walls in electrical engagement with each other and having a common opening therethrough, a non-linear capacitive coupling structure having a predominantly reactive electrical characteristic in the common opening and extending into and terminating in the respective waveguides, the structure being arranged to couple one of the pair of resonant waveguide circuits to the other of the pair of resonant waveguide circuits with capability for frequency conversion therebetween, a low Q tuned iris in said input waveguide circuit positioned for reflecting proper impedance to said coupling structure, and a plurality of low Q tuned irises in the output waveguide circuit arranged for suppression of undesired frequencies.

15. The combination as in claim 7 wherein the lossy impedance matching element is of ferrite.

References Cited by the Examiner

UNITED STATES PATENTS

| | | | |
|---|---|---|---|
| 2,460,109 | 1/1949 | Southworth | 321—69 |
| 2,817,760 | 12/1957 | Dobbertin | 321—69 |
| 2,970,275 | 1/1961 | Kurzrok | 330—4.9 |
| 2,978,649 | 4/1961 | Weiss | 321—69 |
| 2,982,922 | 5/1961 | Wilson | 321—69 |
| 3,039,064 | 6/1962 | Dain et al. | 307—88.5 |
| 3,045,115 | 7/1962 | Bossard | 330—4.9 |
| 3,060,364 | 10/1962 | Holcomb | 321—69 |
| 3,060,365 | 10/1962 | Crandell | 321—69 |
| 3,114,881 | 12/1963 | Uenohara | 330—5 |

LLOYD McCOLLUM, *Primary Examiner.*